No. 740,681. PATENTED OCT. 6, 1903.
L. MYERS.
BALL RETAINER.
APPLICATION FILED APR. 13, 1903.
NO MODEL.
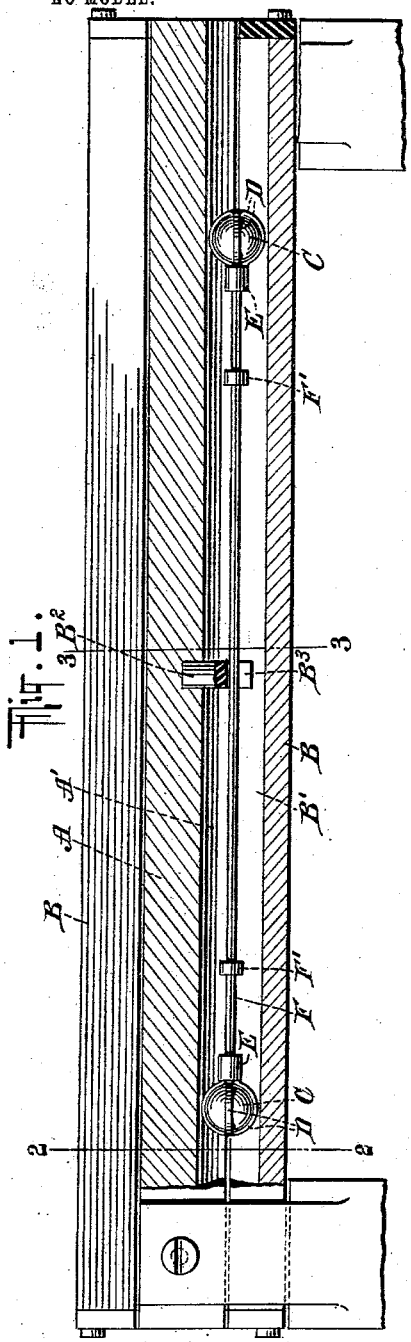
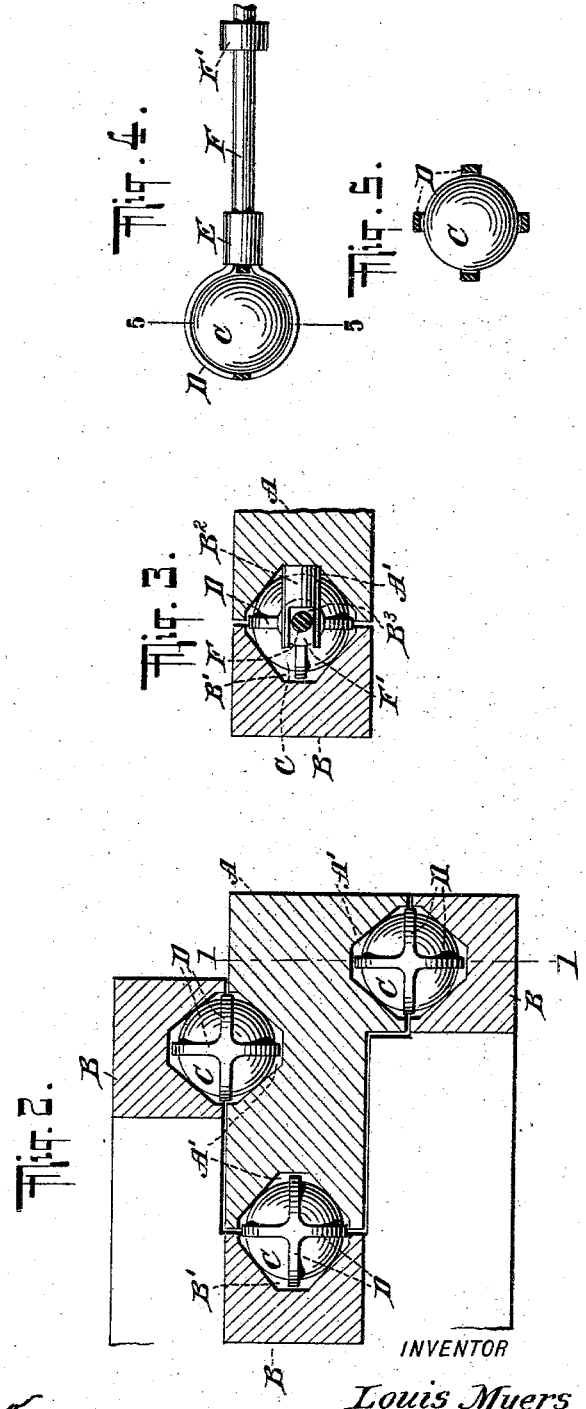
WITNESSES:
INVENTOR
Louis Myers
BY
ATTORNEYS No. 740,681. Patented October 6, 1903.

UNITED STATES PATENT OFFICE.

LOUIS MYERS, OF HARTFORD, CONNECTICUT, ASSIGNOR TO UNDERWOOD TYPEWRITER COMPANY, OF NEW YORK, N. Y., A CORPORATION OF NEW JERSEY.

BALL-RETAINER.

SPECIFICATION forming part of Letters Patent No. 740,681, dated October 6, 1903.

Application filed April 13, 1903. Serial No. 152,316. (No model.)

*To all whom it may concern:*

Be it known that I, LOUIS MYERS, a citizen of the United States, and a resident of Hartford, Hartford county, State of Connecticut, have invented certain new and useful Improvements in Ball-Retainers, of which the following is a specification.

My present invention relates to devices for use in connection with ball-bearings to prevent the balls from traveling beyond certain limits and to keep them at a predetermined distance from each other.

The object of my invention is to provide a simple device of the above-indicated class which will be efficient, yet very inexpensive.

To this end I employ a novel structure which I will now proceed to describe with reference to the accompanying drawings, which illustrate a typical form of my invention, it being understood, however, that my invention is not restricted to this particular embodiment.

Figure 1 is a longitudinal section of a ball-bearing provided with my improved ball-retainer on line 1 1 of Fig. 2. Fig. 2 is a cross-section on line 2 2 of Fig. 1. Fig. 3 is a cross-section on line 3 3 of Fig. 1. Fig. 4 is a partial view of the retainer with one of the balls, and Fig. 5 is a section on line 5 5 of Fig. 4.

The ball-bearing shown in the drawings comprises two members A B, one of which, A, may be stationary, while the other is movable lengthwise thereof. Each member is represented as provided with three grooves A' B', respectively. These grooves are substantially V-shaped and are adapted to contain the balls C and their retainers.

The retainer proper consists of a cage D in the nature of two or more crossed circular strips. Preferably two strips are employed, as shown.

It will be understood that the balls C project between the strips, so as to engage the bearing-surfaces. At the same time the balls are securely held in place. The diameter of the cage is of course such as to allow the ball to rotate therein. The ends of one of the strips which form the cage D are secured in any suitable manner, as by a sleeve E, to the end of a rod F, which forms a connection between the two cages belonging to balls which travel in the same grooves. Thus the said balls are always held at the same distance from each other and a perfect bearing is secured. In order to limit the travel of the movable member B, I provide a projection $B^2$, forming part of or secured to the stationary member A and extending in the groove B' and having a forked end $B^3$, through which passes the rod F. Upon this rod I mount two stop-collars F', which are adapted to engage the projection $B^2$, thus preventing further travel of the balls C and arresting the movable part B.

My invention is applicable wherever a ball-bearing is interposed between two parts that are movable one relatively to the other, whether one of such parts be stationary or not. As an instance of the application of my invention I may say that the stationary part A may form part of the frame of a typewriter, while the movable member B may form part of the carriage. I have shown the three bearings in a staggered position, each of them being in a different horizontal and in a different vertical plane, so that in cross-section the three bearings appear at the corners of a triangle. This feature is not, however, claimed as my invention in the present application.

What I claim as new, and desire to secure by Letters Patent, is—

The combination with two members, one movable relatively to the other, said members being provided with opposing bearing-surfaces and one of them having a projection from its bearing-surface, of balls arranged to travel in engagement with said bearing-surfaces, cages inclosing said balls, a rod connecting said cages and extending through the said projection, said rod being provided with stops adapted to engage said projection.

In testimony whereof I have signed my name to this specification in the presence of two subscribing witnesses.

LOUIS MYERS.

Witnesses:
JOHN LOTKA,
EUGENE EBLE.